UNITED STATES PATENT OFFICE.

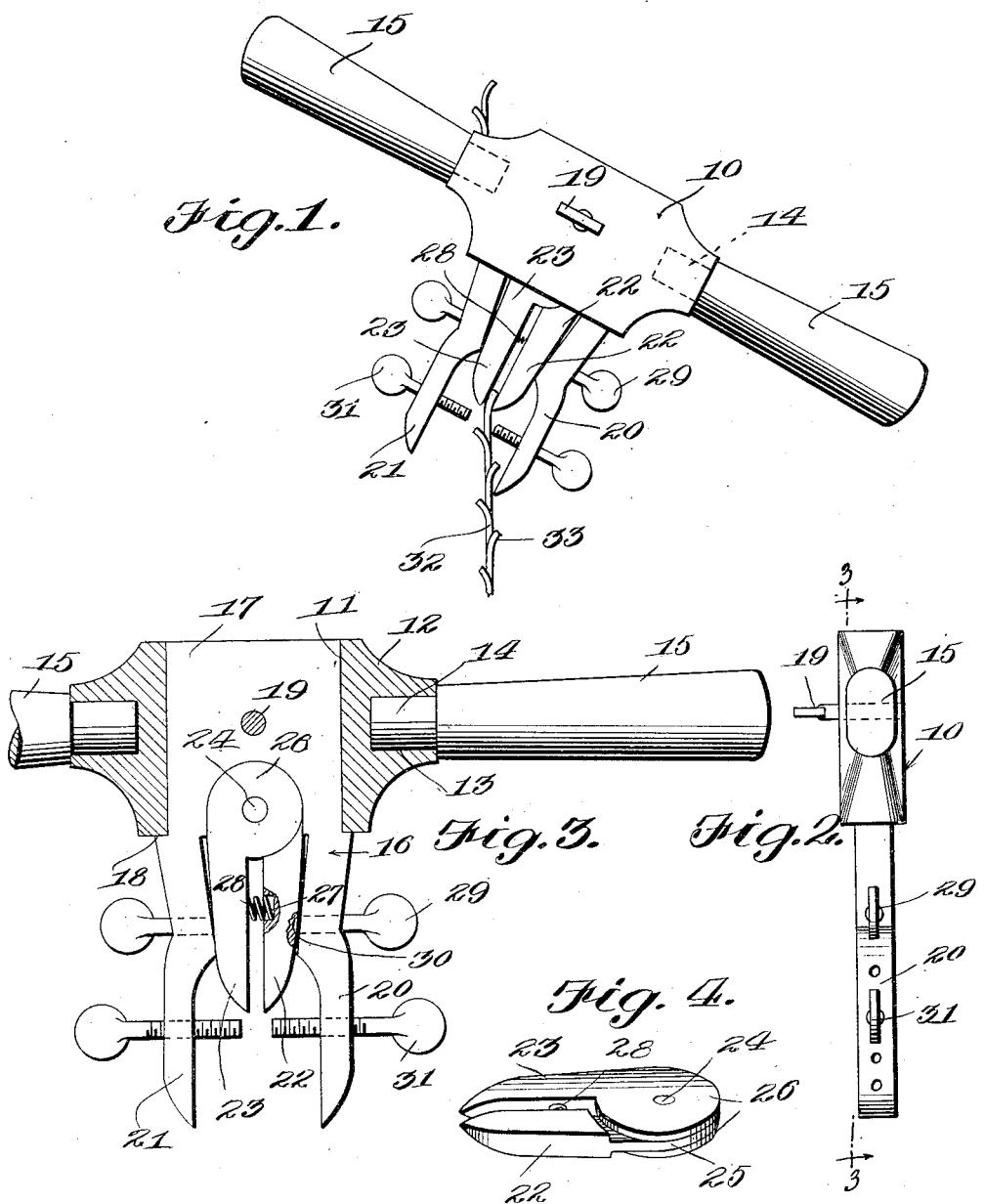

LEMUEL J. HAMPTON, OF GOODLETTSVILLE, TENNESSEE.

SAW-SET.

1,128,443.   Specification of Letters Patent.   Patented Feb. 16, 1915.

Application filed November 3, 1913.  Serial No. 799,048.

*To all whom it may concern:*

Be it known that I, LEMUEL J. HAMPTON, citizen of the United States, residing at Goodlettsville, in the county of Davidson and State of Tennessee, have invented certain new and useful Improvements in Saw-Sets, of which the following is a specification.

My invention relates to an improvement in saw sets, the primary object of my invention being the provision of a saw set which is simple in construction and which may be adjusted for use upon all kinds and sizes of saws and to set the teeth at any desired angle.

A further object of my invention is to construct the saw set in a number of separable parts in order that it may be readily taken apart and packed in small space for shipment or storage and also in order that if any part should become broken it may be replaced at small cost and thereby avoid the necessity of obtaining an entire new tool.

With these and other objects in view, my invention will be more fully described, illustrated in the accompanying drawing, and then specifically pointed out in the claims which are attached to and form a part of this application.

In the drawing: Figure 1 is a top plan view of my improved saw set, showing the manner of employing the same; Fig. 2 is an end view of the saw set; Fig. 3 is a detail sectional view on the line 3—3 of Fig. 2; Fig. 4 is a perspective view of the saw tooth engaging jaws removed from the body of the saw set.

Corresponding and like parts are referred to in the following description and indicated in all the views of the drawing by the same reference characters.

The preferred embodiment of my saw set, as illustrated in the drawing, includes a body portion 10 in the form of a sleeve, the opening 11 of which is preferably rectangular. This sleeve is provided at either side with bosses 12 providing sockets 13 to receive the reduced terminals 14 of handles 15.

A U-shaped member, indicated as a whole by the numeral 16, has a bight portion 17 which is rectangular in cross section to fit snugly in the bore 11 of the sleeve 10, any possibility of movement in this bight portion through the sleeve being prevented by the laterally directed shoulders 18. The member 16 is secured in place by a winged bolt 19 which is threaded through a tapped bore formed in the sleeve 10 and into the bight portion 17 of the member 16. The side portions 20 and 21 of the member 16 form gage jaws for regulating the set of the saw, as will be later explained. These jaws immediately beyond the sleeve 10 converge slightly toward each other after which they are offset away from each other to extend in parallel spaced relation at their free ends, as clearly shown in Figs. 1 and 2.

A pair of pivotally connected co-acting saw tooth engaging jaws are mounted in the bight portion of the member 16. These jaws 22 and 23 are pivotally connected by a pin 24 which extends through an offset, circular ear 25 formed upon one end of the jaw 22 and which seats between similarly formed spaced ears 26 of the jaw 23. These tooth engaging jaws are so proportioned as to fit closely in the bight portion of the member 16 with the outer faces of their free ends bearing against the converging faces of the jaws 20 and 21 when in fully extended position. The opposed inner faces of the jaws 22 and 23 are provided with sockets 27 to receive the ends of a helical spring 28 which tends, at all times, to maintain the jaws in separated position.

Winged adjusting screws 29 are threaded through tapped bores formed in the jaws 20 and 21 and the inner ends of these screws, which are preferably somewhat rounded, engage in sockets 30 formed in the outer faces of the jaws 22 and 23. It will therefore be seen that by proper manipulation of the adjusting screws 29, the said saw tooth engaging jaws may be moved toward or away from each other to adjust them for engagement with saws of varying thicknesses. The free end portions or parallel portions of the jaws 20 and 21 are provided with a series of tapped bores to receive gage screws 31. Each bore of the jaw 20 is in alinement with a corresponding bore formed in the jaw 21 and the adjusting screws 31 are always positioned in a pair of alined bores, as clearly shown in the drawing.

The manner of employing the above saw set is clearly illustrated in Fig. 1 in which I show a conventional form of saw blade 32 having teeth 33. But slight description of this operation is therefore necessary. The saw blade is clamped in a vise or other suitable support with its teeth directed upwardly, as shown, the adjusting screws 29 turned to adjust the saw tooth engaging jaws 22 and 23 toward or away from each other as may be necessary to cause them to closely engage against opposite sides of the teeth and the gage screws 31 passed through the proper bores of the gage jaws 20 and 21 and threaded toward or away from each other to bring them into proper adjustment. When the parts are properly adjusted in this manner, the saw teeth engaging jaws are brought into engagement with one of the saw teeth and the saw set rocked to the right until the right hand gage screw engages against the blade of the saw. The set is fixed upon the next tooth and rocked toward the left until stopped by the left hand gage screw. These gage screws are of course set in such a manner that the teeth bent to the right will be bent to the same extent as those bent to the left.

From the foregoing description, it will be apparent that I have provided a saw set having a vast range of adjustment and one which may be readily taken apart and packed in small space for shipment or storage.

It will of course be understood that I do not wish to be limited to the specific construction illustrated in the drawing and described in the specification, as various minor changes in details of construction may be made at any time without in the slightest degree departing from the spirit of my invention, as defined by the appended claims.

Having thus described the invention, what is claimed as new is:

1. A saw set including a body, gage jaws carried by the body, swingingly connected saw tooth engaging jaws mounted between the gage jaws, and means normally holding the saw tooth engaging jaws apart.

2. A saw set including a body, gage jaws carried by the body, swingingly connected saw tooth engaging jaws mounted between the gage jaws, and means for adjusting said saw tooth engaging jaws apart and away from each other.

3. A saw set including a body, gage jaws carried by the body, swingingly connected saw tooth engaging jaws mounted between the gage jaws, means normally holding the tooth engaging jaws away from each other, and means for adjustably moving said tooth engaging jaws toward each other.

4. A saw set including a sleeve forming a body, a U-shaped member seating by its bight portion of the sleeve with its arms extending to provide gage jaws, swingingly connected saw tooth engaging jaws seated in the bight portion of the U-shaped member and extending between the gage jaws, adjusting screws threaded through the gage jaws and bearing against the tooth engaging jaws to move the same toward and away from each other, and gage screws threaded through the gage jaws.

5. A saw set including a sleeve forming a body member, a U-shaped member seating by its bight portion in the sleeve with its arms extending to provide gage jaws, swingingly connected co-acting saw tooth engaging jaws mounted between the arms of the U-shaped member with their free ends extending between the gage jaws, means normally holding the tooth engaging jaws away from each other, means for moving them toward each other, and gage screws threaded through the free end portions of the gage jaws.

In testimony whereof I affix my signature in presence of two witnesses.

LEMUEL J. HAMPTON. [L. S.]

Witnesses:
 HENRY C. LASSITER,
 WILLIAM R. HALLIBURTON.